United States Patent
Ros Santasusana

(10) Patent No.: US 8,779,914 B2
(45) Date of Patent: Jul. 15, 2014

(54) SAFETY REARVIEW MIRROR

(76) Inventor: Luis Ros Santasusana, Barcelona (ES)

(*) Notice: Subject to any disclaimer, the term of this patent is extended or adjusted under 35 U.S.C. 154(b) by 120 days.

(21) Appl. No.: 13/236,493

(22) Filed: Sep. 19, 2011

(65) Prior Publication Data
US 2012/0134165 A1    May 31, 2012

(51) Int. Cl.
*B60Q 1/26* (2006.01)
(52) U.S. Cl.
USPC .......................... 340/468; 362/494; 362/487
(58) Field of Classification Search
USPC ............ 362/494, 84, 812, 457, 487; 340/468, 340/470; 348/267
See application file for complete search history.

(56) References Cited

U.S. PATENT DOCUMENTS

| | | | | |
|---|---|---|---|---|
| 2,675,983 A | * | 4/1954 | King | 248/475.1 |
| 4,574,269 A | * | 3/1986 | Miller | 362/503 |
| 4,928,084 A | * | 5/1990 | Reiser | 340/479 |
| 5,105,179 A | * | 4/1992 | Smith | 340/468 |
| 6,710,710 B1 | * | 3/2004 | Wang | 340/468 |
| 6,822,673 B1 | * | 11/2004 | Kelly | 348/61 |
| 2004/0105274 A1 | * | 6/2004 | Pommeret et al. | 362/487 |

FOREIGN PATENT DOCUMENTS

GB          2275808 A  *  9/1994

* cited by examiner

*Primary Examiner* — Anabel Ton
(74) *Attorney, Agent, or Firm* — Sturm & Fix LLP

(57) ABSTRACT

A safety rearview mirror for the backseat of automobile vehicles, comprising a rigid plaque which has on one of its faces a finished and reflective surface and on the other face an opaque covering, except for at least, a zone free of the covering, wherein this zone corresponds to signs and/or drawings which are visible through transparency due to a light source associated with the other face. The light source may be of the LED/LCD type or an incandescent lamp.

6 Claims, 4 Drawing Sheets

SAFETY REARVIEW MIRROR

RELATED APPLICATIONS

This application claims priority under 35 U.S.C. §119(a) to Spanish patent application 0300E-32421, filed on Nov. 26, 2010, the disclosure of which is incorporated herein by reference.

BACKGROUND OF THE INVENTION

1. Field of the Invention

The present invention relates to the field of safety devices for vehicles, and particularly, to the making and use of articles intended to improve the safety conditions in vehicles such as those dealing with the prevention of accidents caused by opening and closing a vehicle's backdoors.

2. Discussion of the Background

It is known in the art that the use of vehicles in intense urban traffic conditions, particularly on busy streets and highways, may lead to accidents in situations involving the opening of a vehicle's backdoor, especially in the middle of a traffic jam caused by other vehicles, such as motorbikes and the like.

Therefore, there is a need for a device which may be capable of warning the occupants of a vehicle's backseat in those instances in which a backdoor opens, regarding the immediate presence of other vehicles. This indication will then induce the car's occupants to adopt the safety measures that may be necessary to protect him or herself against collisions which may result in serious injury.

SUMMARY OF THE INVENTION

It is an object of the present invention to provide a safety device that would convey additional information to occupants in a vehicle, especially when these occupants are located in the backseats.

A device is placed at each intermediary post (each hereinafter referred to as "pillar B") of an automobile, which informs an occupant in the backseat about the proximity of another vehicle, approaching the vehicle from the side or from behind and which warns about not opening the backdoor to exit, until there is the enough clearance space between the vehicles.

The device in this case comprises a reflective surface which serves as a rearview mirror and which is provided with a graphic warning and/or caution indication. In order to aide in the explanation, we include the following description of some drawings which illustrate the new safety rearview mirror for the backseats of vehicles, as stated in the claims.

The invention itself, both as to its configuration and its mode of operation will be best understood, and additional objects and advantages thereof will become apparent, by the following detailed description of a preferred embodiment taken in conjunction with the accompanying drawings.

When the word "invention" is used in this specification, the word "invention" includes "inventions", that is, the plural of "invention". By stating "invention", the Applicant does not in any way admit that the present application does not include more the one patentable and non-obviously distinct invention and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The following drawings should be read with reference to the detailed description. Like numbers refer to like elements. The drawings, which are not necessarily to scale, illustratively depict embodiments of the present invention and are not intended to limit the scope of the invention.

DETAILED DESCRIPTION OF THE INVENTION

Figure 1:
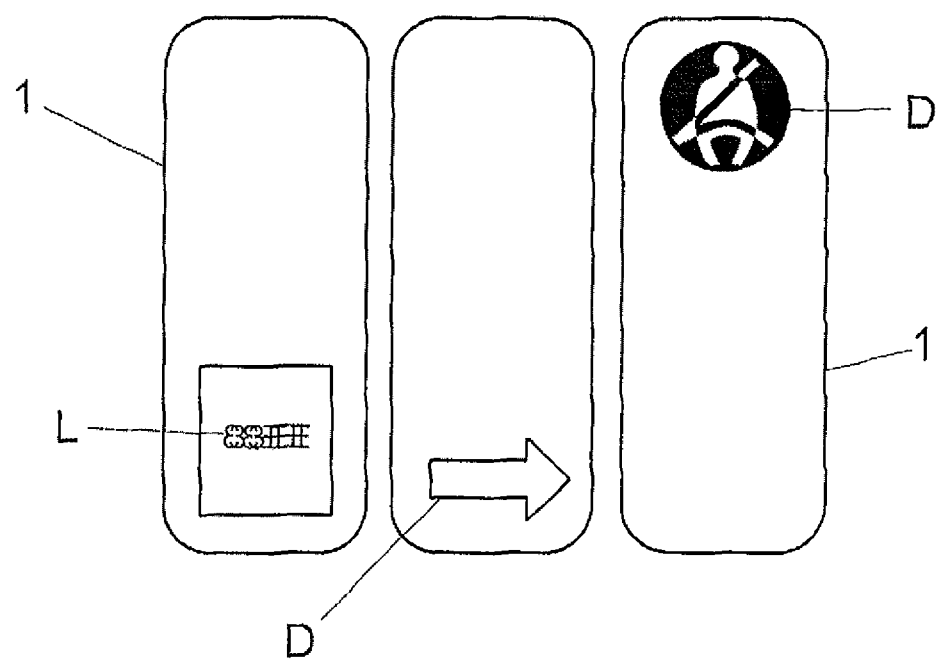
FIG. 1 represents several versions of the new safety rearview mirror.

The elements designated with numbers in the drawings correspond to the parts indicated as follows.

The safety rearview mirror described herein consists basically of a plaque 1 to be applied to a surface, preferably planar, located inside an automobile. The plaque may be made of any adequate rigid material and of any geometrical shape (squared, circular, oval, etc.), as those shown in FIG. 1. One of its sides (frontal) is functional and the other (back) is affixed to the surface using appropriate means, for example, employing an adhesive material on the surface inside the vehicle to which the device will be adhered to.

The frontal face is the functional face of the device and is reflective, that is, with a polished surface and shall, once the plaque is affixed on its operational position, reflect the space in the interior, the side, and the back of the vehicle.

Figure 2:
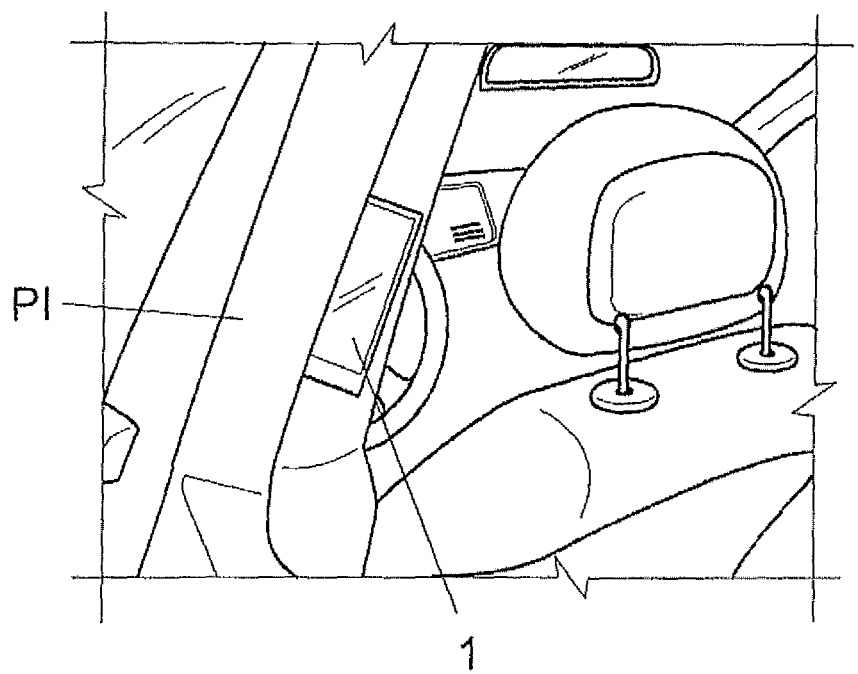
FIG. 2 shows the application of the new device to pillar B on the left hand side of the automobile.
Figure 3:
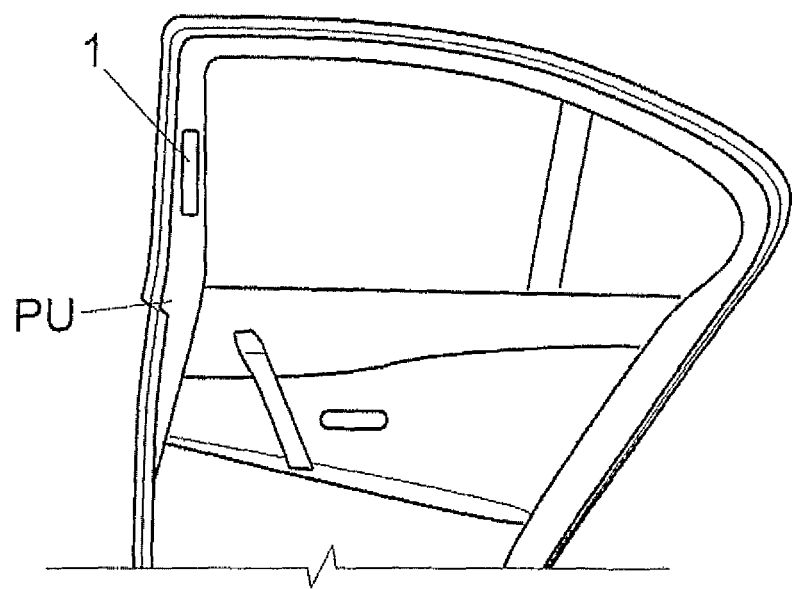
FIG. 3 shows the application of the same device to the right backdoor of an automobile.

FIGS. 2 and 3 show plaque 1 attached to the interior of a pillar P1 of an automobile and to a pole of a backdoor PU of the same vehicle, respectively.

Plaque 1 advantageously incorporates inscriptions L, icons D or other warning signs for the occupants of the back portion of an automobile's cabin, some of which, for example, are shown in FIG. 1. The inscriptions may be, for example, of the kind "Please fasten your seatbelt," "Caution when opening the door," "Please look out before exiting," "No smoking," and the like, wherein the icons and graphics correspond to the these warning messages.

The reflective plaque 1 may be of the type in which the common opaque cover of the surface opposite to the mirror comprise, in transparency, the signs or drawings that the plaque must present that these are only visible in determined conditions (such as, when a passenger enters the cabin or is about to open a door).

In such case, the visibility of the signs or drawings will depend on an adequate illumination applied to the opposite face of the plaque and obtained through an electronic device such as LCD or LED (similar to those commonly used on the instrument panels of vehicles) or simply a small incandescent lamp, powered by the electric wiring of the vehicle.

Figure 4:
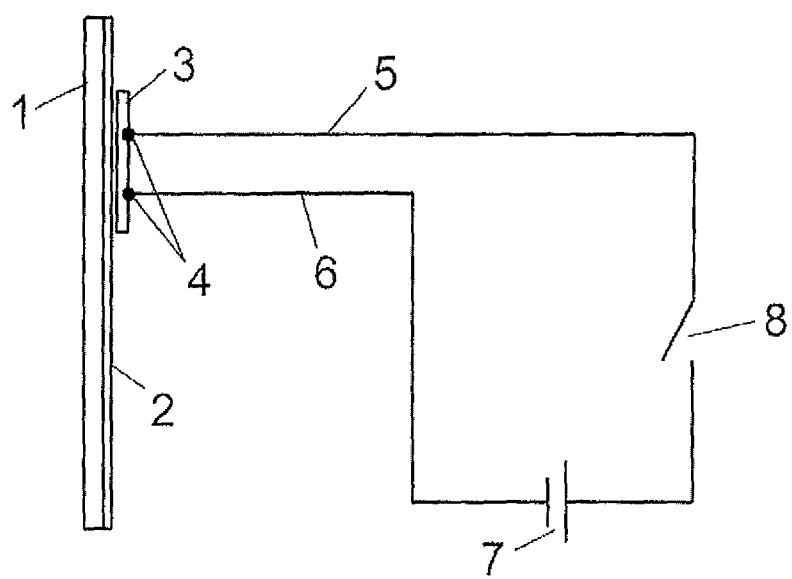
FIG. 4 shows the use of illumination means for the exposure of images or inscriptions on the same device.

FIG. 4 represents an example of an embodiment of the new safety rearview mirror, in which plaque 1 includes a back face 2 provided with an opaque cover, except for the areas in which signs L or drawings D are displayed, and a plaque 3 which includes a light source of one of the types previously described. The terminals 4 of the plaque 3 are conventionally connected through cables 5 and 6 to the electric installation represented by power source (e.g., battery) 7, including a switch 8, activated upon opening a backdoor.

Said signs or drawings may also be included in the external rearview mirrors, on both the left and right hand sides of the vehicle through light sources such as LCD/LED types or an incandescent lamp, as previously mentioned.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

What is claimed is:

1. A safety rearview mirror for the backseat of automobiles, comprising:
    a rigid plaque which has on one of its faces a finished and reflective rearview mirror surface and on its other face an opaque covering except for, at least, a zone free of said covering corresponding to signs or drawings which are visible due to a light source contained on the plaque associated to said other face, wherein the plaque is affixed to a rear portion of the automobile on its interior wherein the mirror surface is positioned to reflect the space in the interior, the side and the back of the automobile and to be viewable by an occupant a back seat of the automobile.

2. A safety rearview mirror for the backseat of automobiles according to claim 1, wherein the plaque is illuminated with a LED.

3. A safety rearview mirror for the backseat of automobiles according to claim 1, wherein the plaque is illuminated with an incandescent lamp.

4. A safety rearview mirror for the backseat of automobiles according to claim 1, wherein the plaque is illuminated with a LCD.

5. A safety rearview mirror for the backseat of automobiles according to claim 1, wherein the plaque is attached to a roof pillar of the automobile.

6. A safety rearview mirror for the backseat of automobiles according to claim 1, wherein the plaque is attached to a pole of a back door of the automobile.

* * * * *